(No Model.) 2 Sheets—Sheet 1.

H. PADDOCK.
COIN OPERATED MEASURING AND WEIGHING MACHINE.

No. 369,073. Patented Aug. 30, 1887.

Witnesses:
Charles R. Searle
H. A. Johnstone

Inventor:
Harolm Paddock
by his attorney
Thomas Drew Stetson

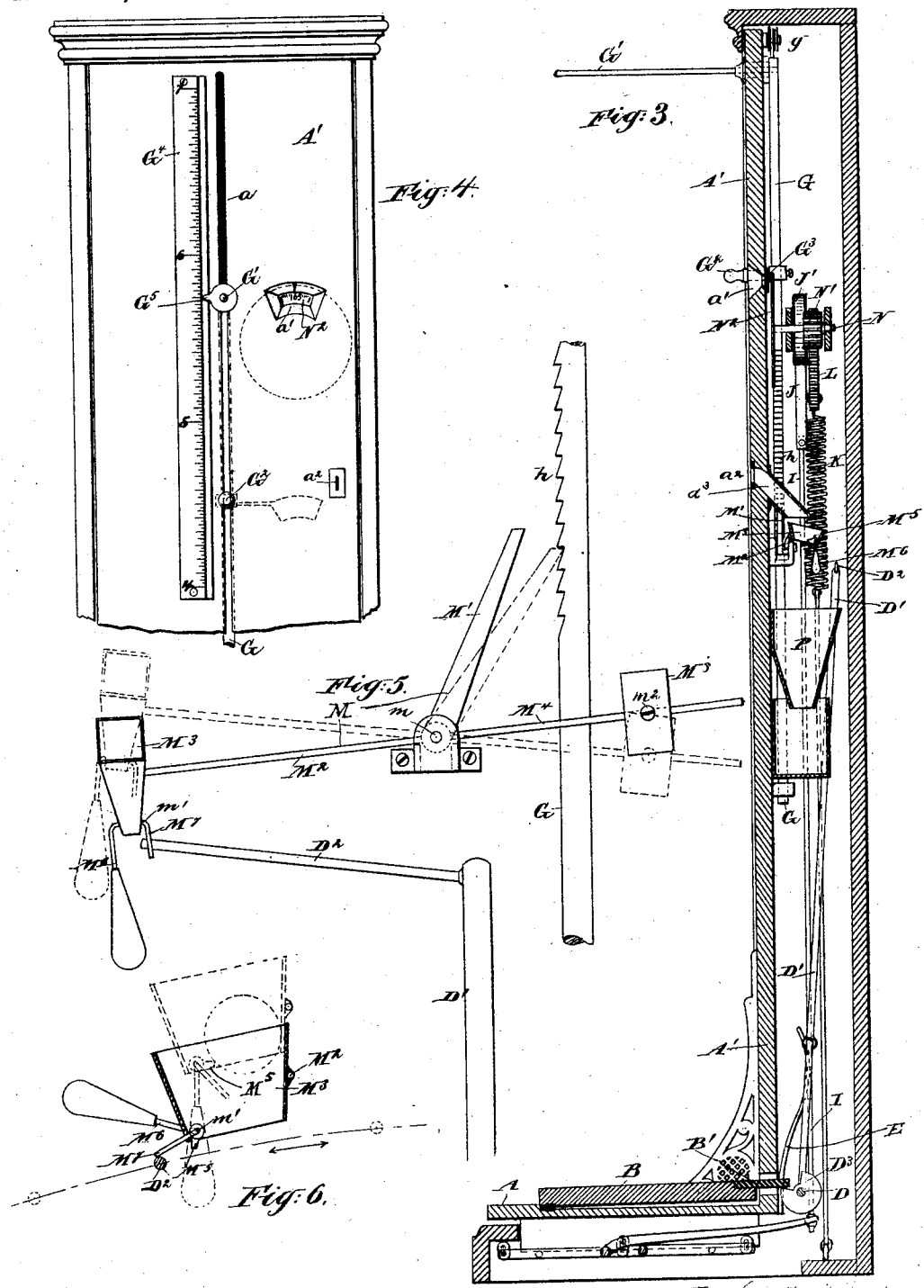

UNITED STATES PATENT OFFICE.

HARVLIN PADDOCK, OF ST. JOHNSBURY, VERMONT.

COIN-OPERATED MEASURING AND WEIGHING MACHINE.

SPECIFICATION forming part of Letters Patent No. 369,073, dated August 30, 1887.

Application filed March 1, 1887. Serial No. 229,303. (No model.)

*To all whom it may concern:*

Be it known that I, HARVLIN PADDOCK, of St. Johnsbury, Caledonia county, in the State of Vermont, have invented a certain new and useful Improvement in Automatic Measuring and Weighing Machines, of which the following is a specification.

There have been long known automatic weighing-machines in which the introduction of a coin of a given size and weight, as a five-cent nickel, allows a weighing-machine to indicate the weight of the person. There have also been employed weighing-scales having measuring-scales attached.

I have devised a measuring scale which is automatically locked and unlocked. The measuring apparatus is kept out of use, except as it is liberated by the automatic mechanism by the use of a proper coin. It is again secured at the close of each operation. I have combined such an automatically-liberated measuring apparatus with a weighing-machine so conditioned that the weighing mechanism can be made available only when the measuring parts have been automatically released. Without the introduction of the proper coin neither part of the apparatus can be used.

I will proceed to describe what I consider the best means of carrying out the invention.

The accompanying drawings form a part of this specification.

Figure 1:
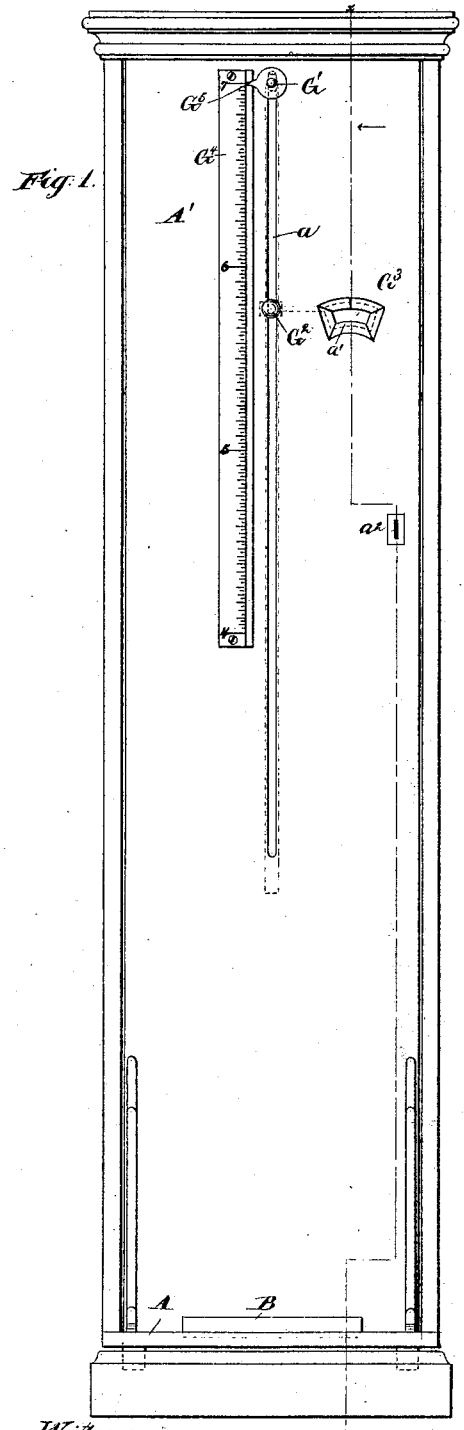
Figure 2:
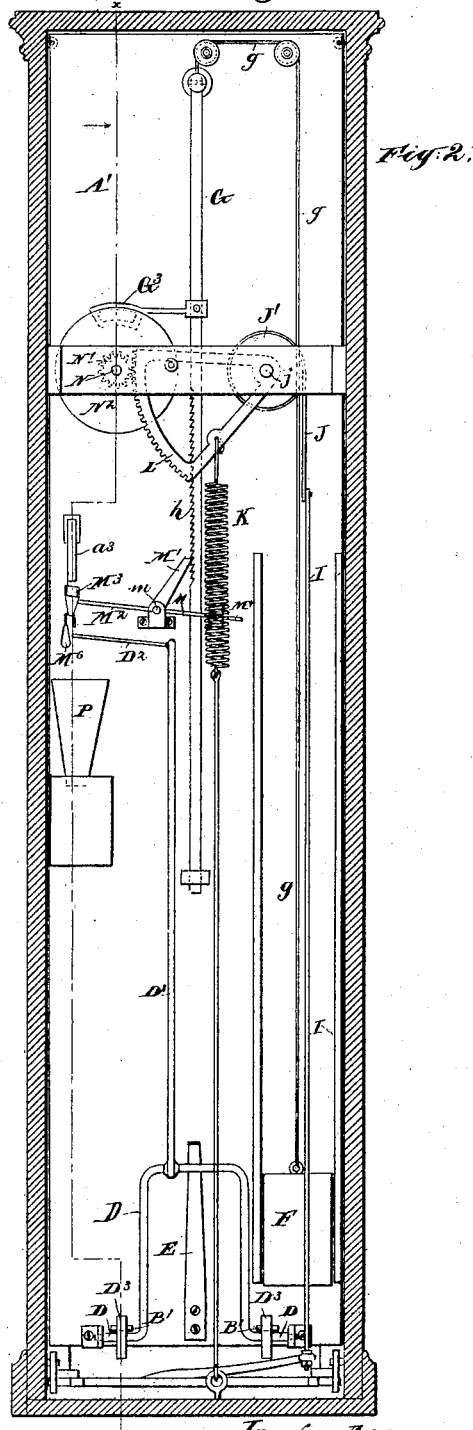

Figure 1 is a front elevation. Fig. 2 is a view from the rear with the casing removed. Fig. 3 is a vertical section on the line $x\,x$, Figs. 1 and 2. Fig. 4 is a front view of a portion showing the device in use. The remaining figures show details on a larger scale. Fig. 5 is a back view of the money-pan and its connections. The strong lines show the position assumed after the coin is received. Fig. 6 is a vertical section through the money-pan. The strong lines show the conditions under which the coin is discharged.

Similar letters of reference indicate corresponding parts in all the figures where they occur.

Upon the weighing-platform A, which is carried on compound levers freely turning on knife-edges arranged and connected in any ordinary or suitable manner, I mount a secondary or movable platform, B. This is hinged to A at the front, allowing its rear to rest on notched disks $D^3$ on a rocking cranked shaft, D, turning in bearings on the upright board A', carried on the platform A. This shaft D is controlled by a spring, E, of sufficient force and so conditioned as to hold the platform B an eighth of an inch, or some other small amount, above its firm bearing on the platform A.

When the person to be weighed steps on the platform B, he not only puts his weight through it on the platform A, and thus, through the usual levers and connections, produces the required change in the position of the indicator to indicate the weight, but also, by causing the platform B to move downward relatively to A to a small extent, effects another important movement, which will be explained farther on.

The lever D', fixed on the shaft D, is urged backward by the spring E, and has an arm, $D^2$, which extends laterally, the function of which will presently appear.

G is a rod extending up and down in rear of the upper portion of the board A', with liberty to move vertically when not obstructed. The gravity of this rod and its connections is overbalanced by a weight, F, suspended by a connecting-cord, $g$, running over pulleys. An arm, G', extends forward from the upper portion of this rod G (see Fig. 3) through a vertical slot, $a$, in the board A'. (See Fig. 4.) A handle, $G^2$, extends forward from G (see Fig. 3) through the slot at a lower level. A screen, $G^3$, extends laterally from the rod G in the position represented. On one side of the rod G teeth are cut, as indicated by $h$.

I is a rod extending up and down and connecting the weighing-lever to a flexible strap, J, wound on a drum, J', which is fixed on a shaft, $j$, which has a segment-arm, L, toothed as shown, and drawn downward by a spring, K. (See Fig. 2.)

The weight of the person being weighed, acting, through the upper platform, B, the main platform A, and the proper supporting-levers, on the vertical rod I and strap J, turns the drum J' on its shaft $j$ against the force of the spring K. The extent to which the arm L thus tilts will depend upon his weight. Like other spring-scales, it will tilt until the increased force of the spring due to its extended condition balances the weight as thus transmitted to it. The segment L engages with a pinion, N', on the shaft N, and thus rotates the disk N², which is mounted immediately behind the board A' and carries a series of numbers on its face for indicating the weight. The rotation brings into coincidence with the aperture a' in the board A the proper figure to indicate the weight; but as yet the weight cannot be read, because of a screen, G³, interposed in front of N², between it and the board A'. This screen (shown in dotted lines in Figs. 1 and 2) is carried by an arm fixed on the rod G, so that it moves up and down therewith.

Near the mid-height of the board A', I provide a lever, M, turning on a pivot, m, fixed in the board A'. One arm, M', of this lever serves as a dog to engage the teeth h. Another arm, M², carries a light money-pan, M³, the bottom of which is open, except as it is partially closed by a cam, M⁵, on a transverse shaft, m', carried in bearings on the pan M³, which shaft is controlled by two arms, M⁶ and M⁷. The arm M⁶ is loaded, and acts by its gravity to hold the cam M⁵ always in the position to partially close the aperture in the bottom of the money-pan M³. The other arm, M⁷, is subject to the action of means whereby the cam is tripped at the proper times.

An arm, M⁴, of the lever M carries an adjustable weight, M⁸, secured by a pinching-screw, m². This weight is adjusted to overbalance the other parts, and to hold the money-pan M³ elevated and the dog M' engaged with the teeth h, except when the balance is disturbed by some extraneous force.

A five-cent nickel introduced through the slot a² in the board A' slides down the sheet-metal spout a³, and is conducted into the pan M³. Its weight will overcome the gravity of the counter-weight M⁸ and of the dog M', and, tilting the entire lever M on the pivot m, will lift the dog out of engagement with the teeth h, leaving the rod G free to be depressed at will by a sufficient force applied through the handle G².

The front of the board A' carries a nicely-graduated scale, G⁴, extending up and down near the slot a. The operator may move the now free rod G and its attachments down until he has determined by trial the point at which the arm G' (see Figs. 3 and 4) will touch the top of his head. When this is found, the pointer G⁵, serving as an index on the arm G', will show on the scale G⁴ on the front the height of the person. On thus drawing the rod G and its attachments gently downward the screen G³ will be removed from its former position and will allow the figures indicating the weight to be read through the proper opening in the front board, A', by the person standing on the platform B and by any others in the vicinity. When both operations of weighing and measuring are concluded, the operator steps off the platform B and the parts are again thrown out of use. This is effected by the mechanism before partially referred to.

The weight of the person being weighed, by depressing the platform D relatively to A, acts by the arms B' in the notches shown in the two disks D³ to turn the crank-shaft D and raise the arm D' into a perpendicular position against the force of the spring E. This is the normal position of these parts while the apparatus is in action, the lateral arm D² from the lever D' lying close to the rear face of the upright board A'; but so soon as the person steps off and relieves the platform B of his weight, the elasticity of the spring E urges the lever D' rearward, to which force it promptly yields, and acts by its arm D² against the lever M⁷ and tilts the cam M⁵. This movement is that required to liberate the nickel, which instantly falls into any suitable receptacle, either directly or through the spout P, which may lead to any desired point. On being relieved from the coin the lever M and its attachments instantly resume their original position. This movement again engages the dog M' with the teeth h, and holds the rod G immovably up. The cam M⁵ similarly resumes its original position so soon as the arm M⁷ has performed its function and the nickel has been discharged.

The parts remain immovable with the rod G and its attachments held firmly up, and with the screen G³ interposed, to prevent the inspection of the figures on the dial N² until another nickel is introduced, when the round of operations is repeated.

Modifications may be made in the details without departing from the principle or sacrificing the advantages of the invention.

I can use the measuring mechanism without using the weighing-machine, if preferred. The measuring apparatus may be constructed alone without any weighing apparatus; but I prefer the whole used together and arranged as shown, so that the weighing cannot be determined until the measuring device is liberated.

I claim as my invention—

1. In combination, mechanism for measuring height, mechanism for determining weight, and mechanism operated by a coin, arranged so that the introduction of the proper coin shall be necessary to ascertain either the weight or the height, substantially as herein specified.

2. The combination of a measuring device and means for temporarily liberating it by the introduction of a coin, and for discharging the coin and relocking the device, with a weighing apparatus arranged for joint operation, so that the liberation of the measuring parts shall be necessary to determine the weighing, substantially as herein specified.

In testimony whereof I have hereunto set my hand, at New York city, this 24th day of February, 1887, in the presence of two subscribing witnesses.

HARVLIN PADDOCK.

Witnesses:
M. F. BOYLE,
H. A. JOHNSTONE.